United States Patent [19]
Ito et al.

[11] 3,902,696
[45] Sept. 2, 1975

[54] EXHAUST GAS CONTROL VALVE

[75] Inventors: Mikiji Ito, Nagoya; Motohisa Miura, Kariya; Toshiyuki Ito, Tokoname, all of Japan

[73] Assignee: Nippondenso Co., Ltd., Kariya, Japan

[22] Filed: Sept. 25, 1973

[21] Appl. No.: 400,684

[30] Foreign Application Priority Data
Sept. 26, 1972 Japan.............................. 47-111910

[52] U.S. Cl............................ 251/61.5; 251/335 B
[51] Int. Cl.²........................................ F16K 31/126
[58] Field of Search ......................... 251/61–61.5, 251/330, 335 B; 123/119 A

[56] References Cited
UNITED STATES PATENTS

| | | |
|---|---|---|
| 2,925,987 | 2/1960 | Priesmeyer ....................... 251/61.4 |
| 2,934,307 | 4/1960 | Henderson...................... 251/330 X |
| 3,461,913 | 8/1969 | Scott............................. 251/61.5 X |
| 3,672,629 | 6/1972 | Sorteberg...................... 251/61.4 X |
| 3,762,384 | 10/1973 | Day et al. ........................ 123/119 A |

Primary Examiner—Henry T. Klinksiek
Attorney, Agent, or Firm—Cushman, Darby & Cushman

[57] ABSTRACT

An exhaust gas control valve is provided with a first and second valve bodies and valve seats and a bellows member made of fluoric synthetic resin for segregating a diaphragm and a shaft guiding bush from exhaust gas to secure the operation of the control valve without being affected by the exhaust gas thereby to enhance durability of the control valve.

9 Claims, 4 Drawing Figures

EXHAUST GAS CONTROL VALVE

BACKGROUND OF THE INVENTION

This invention relates to the improvement of the exhaust gas control valve which is mounted on a vehicle for reducing harmful components in the exhaust gas from the engine, especially nitrogen oxides. In a conventional exhaust gas control valve, although a diaphragmatic member which is made of heat-resistant rubber, such as fluoric rubber, is provided in the valve for segregating a diaphragm and a shaft guiding bush from the exhaust gas, the diaphragmatic member itself is always exposed to the exhaust gas during a period when the control valve is in the opening state. Therefore, the diaphragmatic member is subject to deformation or damage due to the high-temperature exhaust gas and thereby sticking the valve shaft in the valve shaft guiding bush and damaging the diaphragm by the dust and heat of the exhaust gas.

SUMMARY OF THE INVENTION

With a view to overcome the problem described above, it is a primary object of the present invention to provide an exhaust gas control valve providing a stable operation and a long life. It is another object of the present invention to provide a first and second valve bodies and valve seats and a bellows member for segregating a diaphragm and a shaft guiding bush from exhaust gas.

The above and other objects, features and advantages of the present invention will be apparent from the following detailed description of preferred embodiments taken in conjunction with the accompanying drawings.

BRIEF DESCRIPTION OF THE PREFERRED EMBODIMENTS

Figure 1:
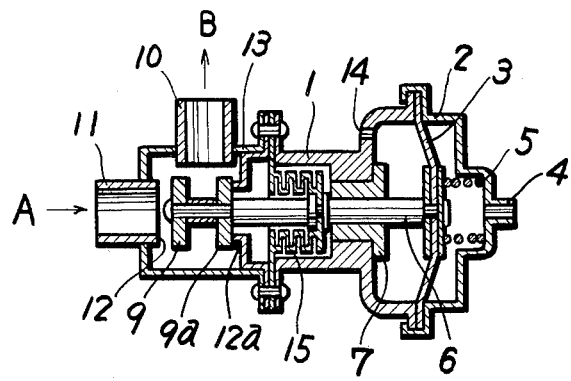
FIG. 1 shows a cross sectional view of the first embodiment of the present invention.
Figure 2:
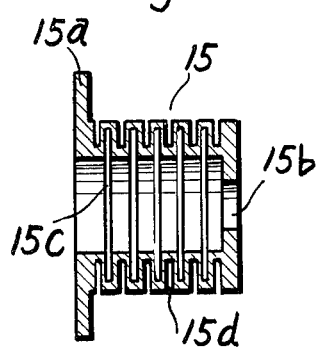
FIG. 2 shows an enlarged cross sectional view of the bellows member of the first embodiment shown in FIG. 1.

Referring to FIGS. 1 and 2 showing the first embodiment, numeral 1 designates a valve housing, 2 a cover for covering one open end of the valve housing. A chamber enclosed with the valve housing 1 and the cover 2 is divided into two portions by a diaphragm 3. The cover 2 has a pipe 4 on the central portion thereof and the negative pressure produced in the intake manifold of the engine is led into the pipe 4. A spring 5 is installed between the cover 2 and the diaphragm 3 so as to push the diaphragm leftward and a through hole 14 is provided through the valve housing 1 to connect the chamber enclosed with the valve housing 1 and the diaphragm 3 with the atmosphere. The diaphragm 3 moves a valve shaft 6 fixed thereto to the left or the right in response to the negative pressure introduced to the chamber enclosed by the diaphragm 3 and the cover 2. The valve shaft 6 is supported by a shaft guiding bush 7 fixedly inserted into the valve housing 1 and has a bellows member 15 fixed thereto at the intermediate portion thereof. The bellows member 15 is made of fluoric synthetic resin and provided with a flange 15a and a hole 15b through which the valve shaft 6 passes and to which the shaft is fixed. A plurality of outer grooves 15d and inner grooves 15c are formed on the cylindrical portion of the bellows member 15 as shown in FIG. 2, so that the bellows member 15 is elongated and shortened in response to the movement of the valve shaft 6. Numerals 9 and 9a designate a first valve body and a second valve body respectively, both of which are fixed on the other end portion of the valve shaft 6. Numeral 10 designates an outlet pipe fixed on a valve casing 13, 11 an inlet pipe. Numeral 12 designates a first valve seat formed on one end portion of the inlet pipe 11. Numeral 12a designates a second valve seat secured between the valve housing 1 and the valve casing 13 together with the flange 15a of the bellows member 15 by means of rivets. The first valve body 9 faces to the first valve seat 12 and the second valve body 9a faces to the second valve seat 12a.

The valve operation of the above described embodiment is as follows. When the relatively high negative pressure is applied to the diaphragm 3 through the pipe 4, the diaphragm 3 mvoes to the right against the force of the spring 5 together with the valve shaft 6 to unseat the first valve body 9 from the first valve seat 12 and to seat the second valve body 9a on the second valve seat 12a as shown in FIG. 1. Under such condition, the exhaust gas from the engine flows into the valve casing 13 through the inlet pipe 11 as shown by arrow A and flows out from the outlet pipe 10 as shown by arrow B. And the bellows member 15 is not exposed to the exhaust gas, since the second valve body 9a is in contact with the second valve seat 12a. Therefore, the bellows member 15 is not damaged by the influence of the exhaust gas. When the negative pressure becomes low, the diaphragm 3 moves to the left, due to the expansion force of the spring 5, together with the valve shaft 6 to seat the first valve body 9 on the first valve seat 12 and to unseat the second valve body 9a from the second valve seat 12a. Therefore, the exhaust gas flow from the pipe 11 into the casing 13 is cut off by the first valve body 9. Under such condition where the exhaust gas is shut off, no harmful influence of the exhaust gas is transferred to the bellows member. During above described valve operation, the bellows member 15 is sufficiently elongated or shortened according to the movement of the valve shaft 6 and effectively seals the diaphragm 3 and the shaft guiding bush 7 from the influence of the exhaust gas.

Figure 3:
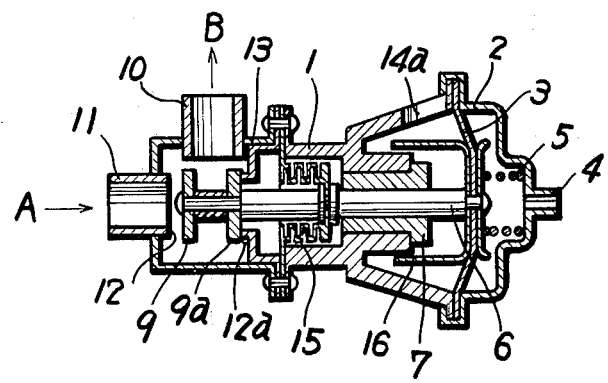
FIG. 3 shows a cross sectional view of the second embodiment of the present invention.

Next, referring to FIG. 3 showing the second embodiment, numeral 16 designates a retaining member for fastening the valve shaft 6 to the diaphragm 3. The retaining member 16 is formed to be cup-shaped to cover the shaft guiding bush 7. Numeral 14a designates relatively large through holes for cooling the interior of the valve housing 1, especially the diaphragm 3 by atmospheric air introduced thereto. A plurality of the through holes 14a may be provided for better cooling. The other construction of the second embodiment shown in FIG. 3 is same as described in the first embodiment of FIG. 2 and the valve operation of the second embodiment described above differs little from that of the first embodiment. In the second embodiment, the interior of the valve housing 1, especially the diaphragm 3 can be cooled sufficiently because of the large through hole or holes 14a, and the dust in the atmosphere and the muddy water on the road is interrupted to come into the clearance between the shaft guiding bush 7 and the shaft 6 through the holes 14a by the cup-shaped retaining member 16.

Figure 4:
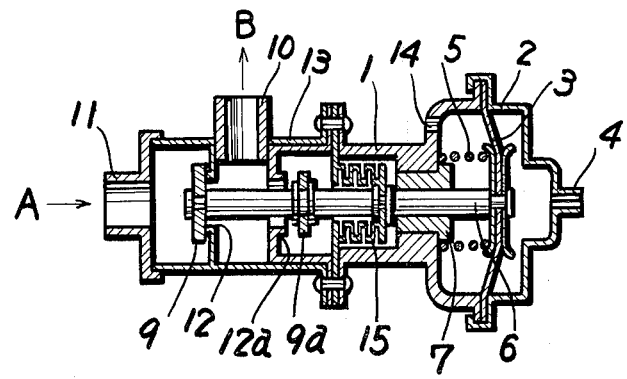
FIG. 4 shows a partial cross sectional view of the third embodiment of the present invention.

Next, referring to FIG. 4 showing the third embodiment, the first and second valve bodies 9 and 9a are provided as shown therein. The first valve seat 12 is provided separately from the inlet pipe 11 and the second valve seat 12a is provided oppositely to those of the foregoing two embodiments. In this embodiment, the positive pressure produced in an outlet pipe of an air pump mounted on the engine is applied to the diaphragm 3 through the pipe 4. Therefore, when the positive pressure becomes high, the diaphragm 3 and the valve shaft 6 move to the left against the force of the spring 5 to unseat the first valve body 9 from the first valve seat 12 and to seat the second valve body 9a on the second valve seat 12a, thereby protecting the bellows member 15 and diaphragm 3 from the exhaust gas. Under such condition, the exhaust gas flows through the pipes 11 and 10 as shown by arrows A and B. On the other hand, when the positive pressure becomes low, the valve shaft 6 moves to the right to cut off the exhaust gas flow by the first valve body 9 as shown in FIG. 4. According to this embodiment, as the exhaust gas pushes the first valve body 9 toward the first valve seat 12 when it is cut, the first valve body 9 does not vibrate even when the pressure of the exhaust gas varies.

Further, the valve bodies 9 and 9a can be operated in any embodiment by other than diaphragm arrangement, for example by electromagnetic means.

As the exhaust gas control valve according to the present invention is constructed above, it can achieve the aforementioned primary object with simple construction.

What we claim is:
1. An exhaust gas control valve, comprising:
a valve housing;
a diaphragm fixed to the housing for being operated in response to pressure applied thereto;
opening means through the housing for communicating operating pressure to one side of the diaphragm;
an engine exhaust inlet to and an engine exhaust outlet from said housing;
a shaft fixed to the diaphragm, for axial movement within the housing upon flexure of the diaphragm;
a first valve seat provided on said valve housing between said inlet and said outlet;
a first valve body fixed on the shaft to be seated on the first valve seat for preventing flow of the exhaust gas from the inlet to the outlet, upon corresponding axial movement of the shaft;
resilient means applied between the shaft and the housing for tending to seat the first valve body on the first valve seat in opposition to the pressure communicated through the opening means to the diaphragm;
a second valve seat provided in the housing, surrounding the shaft, downstream of where the inlet and outlet communicate within the housing;
a second valve body fixed on the shaft, with axial spacing from the first valve body, to be seated on the second valve seat for interrupting the flow of exhaust toward said diaphragm when the first valve body is unseated from said first valve seat upon corresponding axial movement of the shaft;
an annular, axially enlongated bellows member composed of temperature-resistant flexible, fluoric synthetic resin material installed axially between said diaphragm and said valve bodies and radially between the shaft and the valve housing, for preventing exhaust gas from access to said diaphragm and being axially extensible and retractable upon corresponding axial movement of the shaft;
and an annular bearing bush provided and mounted in the housing axially between said bellows member and said diaphragm, journalling said shaft for sliding movement within the housing.

2. The exhaust gas control device of claim 1, wherein the bellows member includes a flange at one end fixed to the valve housing, an end plate at the opposite end, having an aperture through which the shaft extends, and having an axially intermediate portion provided with a plurality of external and internal circumferentially extending grooves.

3. The exhaust gas control device of claim 1, wherein the first valve body is located between the exhaust inlet and the first valve seat and wherein the recited elements are so disposed relative to one another that when positive pressure is applied to the diaphragm through said opening means, the diaphragm flexes in a sense to move the shaft in the axial direction which unseats the first valve body from the first valve seat, whereby, when the first valve body is seated on the first valve seat, exhaust gas communicated to the first valve body through the exhaust inlet tends to press the first valve body toward the first valve seat.

4. The exhaust gas control device of claim 1, wherein a substantial annular clearance is provided between the second valve seat and the shaft, whereby, even though the shaft extends axially substantially from where it is journalled by said bearing bush, it moves clear of the second valve seat.

5. The exhaust gas control device of claim 4, wherein the bellows member includes a flange at one end fixed to the valve housing, an end plate at the opposite end, having an aperture through which the shaft extends, and having an axially intermediate portion provided with a plurality of external and internal circumferentially extending grooves.

6. The exhaust gas control device of claim 4, wherein the first valve body is located between the exhaust inlet and the first valve seat and wherein the recited elements are so disposed relative to one another that when positive pressure is applied to the diaphragm through said opening means, the diaphragm flexes in a sense to move the shaft in the axial direction which unseats the first valve body from the first valve seat, whereby, when the first valve body is seated on the first valve seat, exhaust gas communicated to the first valve body through the exhaust inlet tends to press the first valve body toward the first valve seat.

7. An exhaust gas control valve, comprising:
a valve housing;
an engine exhaust inlet to and an engine exhaust outlet from said housing;
a shaft received in the housing for axial movement within the housing;
a first valve seat provided on said valve housing between said inlet and said outlet;

a first valve body fixed on the shaft to be seated on the first valve seat for preventing flow of the exhaust gas from the inlet to the outlet, upon corresponding axial movement of the shaft;

a second valve seat provided in the housing on the opposite side of the second valve seat from the first valve seat and including means responsive to the condition of engine operation to move the shaft from a datum position wherein the first valve member is seated on the first valve seat, to unseat the first valve body and thereby permit exhaust gas to flow from the inlet to the outlet through the valve housing while the condition persists;

an annular, axially elongated bellows member composed of temperature-resistant flexible, fluoric synthetic resin material installed axially between said shaft driving means and said valve bodies and radially between the shaft and the valve housing for preventing exhaust gas from access to said shaft driving means and being axially extensible and retractable upon corresponding axial movement of the shaft;

and an annular bearing bush provided and mounted in the housing axially between said bellows member and said shaft driving means journalling said shaft for sliding movement within the housing.

8. The exhaust gas control device of claim 7, wherein a substantial annular clearance is provided between the second valve seat and the shaft, whereby, even though the shaft extends axialy substantially from where it is journalled by said bearing bush, it moves clear of the second valve seat.

9. The exhaust gas control device of claim 8, wherein the bellows member includes a flange at one end fixed to the valve housing, an end plate at the opposite end, having an aperture through which the shaft extends, and having an axially intermediate portion provided with a plurality of external and internal circumferentially extending grooves.

* * * * *